(12) United States Patent
Yamazaki

(10) Patent No.: US 8,730,244 B2
(45) Date of Patent: May 20, 2014

(54) METHOD AND DEVICE FOR GENERATING CHARACTER DATA, METHOD AND CONTROL DEVICE FOR DISPLAYING CHARACTER DATA, AND NAVIGATION APPARATUS

(75) Inventor: Noboru Yamazaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1329 days.

(21) Appl. No.: 12/166,009

(22) Filed: Jul. 1, 2008

(65) Prior Publication Data
US 2009/0022426 A1    Jan. 22, 2009

(30) Foreign Application Priority Data

Jul. 20, 2007   (JP) ................. 2007-189048

(51) Int. Cl.
*G06T 11/00*    (2006.01)
*G06K 9/36*     (2006.01)
*G06K 9/32*     (2006.01)
*G06T 11/20*    (2006.01)

(52) U.S. Cl.
CPC ............ *G06K 9/3283* (2013.01); *G06K 9/3258* (2013.01); *G06K 9/3208* (2013.01); *G09G 2340/0492* (2013.01); *G06T 11/203* (2013.01); *G06K 9/32* (2013.01)
USPC ........... 345/467; 382/176; 382/177; 382/290; 382/292; 345/649; 345/650; 345/657; 345/661; 345/662; 345/468; 345/469

(58) Field of Classification Search
CPC ........... G09G 2340/0492; G09G 5/363; G06T 11/60; G06T 11/203; G06K 9/3283; G06K 9/3258; G06K 9/3208
USPC .................. 345/649, 661, 467; 701/208, 211; 358/3.26, 1.11; 382/296
See application file for complete search history.

(56) References Cited

U.S. PATENT DOCUMENTS 5,549,399 A   8/1996   Sakuragi et al.
5,559,938 A   9/1996   Roekel et al.
(Continued)

FOREIGN PATENT DOCUMENTS

EP   0 652 418   5/1995
EP   1 659 567   5/2006
(Continued)

OTHER PUBLICATIONS

Office Action for EPO08012422.5 mailed Oct. 10, 2011, 8 pgs.
(Continued)

*Primary Examiner* — Jin-Cheng Wang
(74) *Attorney, Agent, or Firm* — Brinks Gilson & Lione

(57) ABSTRACT

A device includes a character-data rotating section that rotates a regular-position character by a predetermined angle with respect to a reference point that is the center point of the background area of the regular-position character by using regular-position character data having a rotation angle of 0° and a center-point matching processing section that horizontally and/or vertically enlarges the background area of the rotated character data to cause the center point of the rotated character and the center point of BMP data to match each other even with respect to rotated character data. Thus, when multiple pieces of character data are arranged so that the center points thereof lie on a reference line, not only are the center points of the characters aligned along the reference line, but also bottom portions of the characters aligned with respect to the reference line.

13 Claims, 9 Drawing Sheets

(56) References Cited

U.S. PATENT DOCUMENTS

| | | | | |
|---|---|---|---|---|
| 6,828,971 | B2* | 12/2004 | Uesaki et al. | 345/473 |
| 7,304,653 | B2* | 12/2007 | Ueno | 345/649 |
| 2005/0052413 | A1* | 3/2005 | Ueno | 345/158 |
| 2005/0243104 | A1* | 11/2005 | Kinghorn | 345/649 |
| 2006/0227349 | A1* | 10/2006 | Yamaguchi et al. | 358/1.11 |
| 2007/0021911 | A1* | 1/2007 | Kikuchi et al. | 701/211 |
| 2007/0091375 | A1* | 4/2007 | Manabe | 358/3.26 |
| 2008/0231643 | A1* | 9/2008 | Fletcher et al. | 345/661 |
| 2008/0306684 | A1* | 12/2008 | Yamazaki | 701/208 |
| 2008/0317341 | A1* | 12/2008 | Speigle et al. | 382/170 |
| 2008/0317343 | A1* | 12/2008 | Ferman et al. | 382/176 |

FOREIGN PATENT DOCUMENTS

| | | |
|---|---|---|
| EP | 1 710 713 | 10/2006 |
| JP | 63-218992 | 9/1988 |
| JP | 05-181412 | 7/1993 |
| JP | 11-015459 | 1/1999 |

OTHER PUBLICATIONS

JPO for Japanese Patent Application No. 2004-189048, dispatch date Jan. 14, 2014, English translation included.

* cited by examiner

FIG. 1
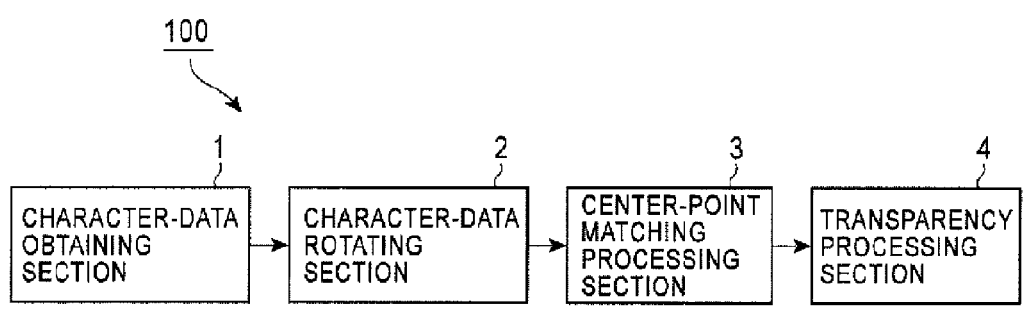
FIG. 2A    FIG. 2B    FIG. 2C
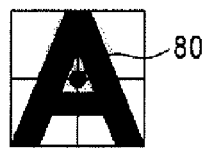    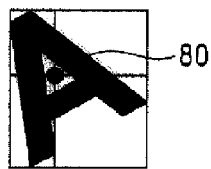    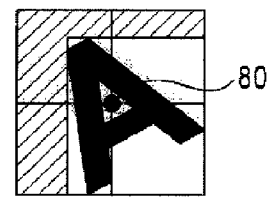

FIG. 12
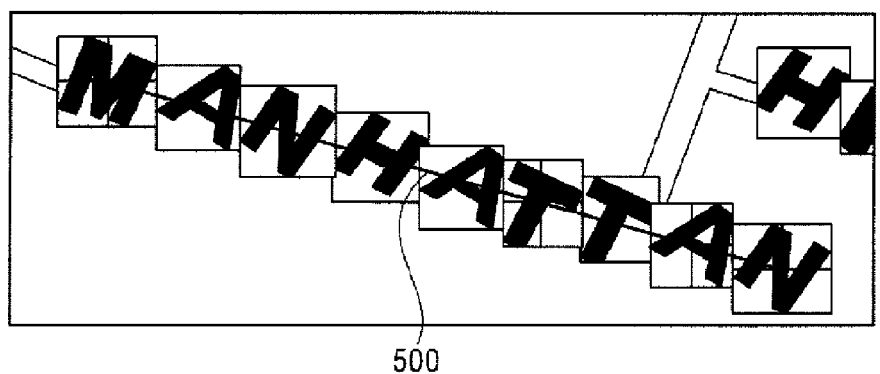
FIG. 13A  FIG. 13B
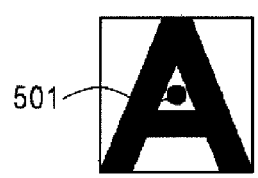 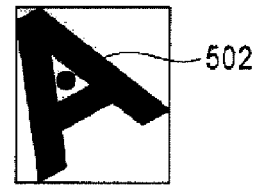

METHOD AND DEVICE FOR GENERATING CHARACTER DATA, METHOD AND CONTROL DEVICE FOR DISPLAYING CHARACTER DATA, AND NAVIGATION APPARATUS

BACKGROUND OF THE INVENTION

1. Related Application

The present application claims priority to Japanese Patent Application Number 2007-189048, filed Jul. 20, 2007, the entirety of which is hereby incorporated by reference.

2. Field of the Invention

The present invention relates to a method and a device for generating character data, a method and a control device for displaying character data, and a navigation apparatus. For example, the present invention preferably is applied to a navigation apparatus that is adapted to display a character string for a road name or the like by arranging multiple pieces of character data, each piece representing one character.

3. Description of the Related Art

A typical on-board navigation apparatus uses a dead reckoning sensor and a GPS (global positioning system) receiver to detect the current position of a vehicle, reads data of a map for the vicinity thereof, and displays the map on a screen. The navigation apparatus then displays a vehicle position mark indicating the vehicle position in a superimposed manner at a predetermined spot on the screen to allow at-a-glance recognition as to where the vehicle currently is traveling.

Road names are displayed in the vicinity of roads on a map on the display screen. Typically, a navigation apparatus that does not have a high-performance CPU (central processing unit) converts characters into bitmap (BMP) images character by character and stores the characters, in order to reduce the processing load for displaying the characters and to increase the display speed. The BMP data of characters that constitute a road name or the like are arranged sequentially to display one character string in a row on the map.

In general, navigation apparatuses used in the United States and Europe display road names along roads on a map. In many cases, roads are obliquely rendered, and thus, characters need to be rotated in order to cause character strings to be displayed along the oblique roads. FIG. 12 shows a state in which the BMP data of rotated characters are arranged in a row along an oblique road; As shown in FIG. 12, conventionally, when multiple characters are to be obliquely displayed in a row, the center point of the BMP data of each character is determined and the BMP data are arranged so that the center points lie on a straight line 500 that is parallel to the road.

For example, Japanese Unexamined Patent Application Publication No. 5-181412 discloses a technology in which the center point of a character string included in character data whose gradient angle is adjusted to substantially 0° is determined and the character string is displayed so that the center point matches a predetermined position on graphics data.

FIG. 13A shows an example of BMP data of a character at a regular position (where the rotation angle is 0°), and FIG. 13B shows an example of BMP data of a character obtained by rotating the regular-position character by a predetermined angle. As shown in FIG. 13A, for the regular-position character, BMP map data is created so that a center point 501 of the character matches the center point of the BMP data. However, as shown in FIG. 13B, when a rotated character is created through rotation of the regular-position character by a predetermined angle, a center point 502 of the rotated character and the center point of the BMP data may not match each other. Thus, when BMP data of multiple types of rotated characters are arranged so that the center points are aligned on one straight line, the bottom portions of the characters are not aligned with each other as shown in FIG. 14. Thus, there is a problem in that the characters look uneven from the viewpoint of bottom alignment.

BRIEF SUMMARY

The present invention has been conceived to address such a problem, and an object of the present invention is to display multiple pieces of character data in an easy-to-view manner with bottom portions of characters being aligned with each other, when the multiple pieces of bitmapped character data are obliquely arranged in a row.

In order to overcome the above-described problem, one embodiment of the present invention provides a configuration that includes a character-data rotating section and a center-point matching processing section. By using regular-position character data containing a regular-position character having a rotation angle of 0° and a background area of the regular-position character, the character-data rotating section rotates the regular-position character in a predetermined direction by a predetermined angle with respect to a reference point that is the center point of the background area of the regular-position character. The center-point matching processing section horizontally and/or vertically enlarges the background area of rotated character data generated by the character-data rotating section, so that the center point of enlarged rotated character data and the center point of the rotated character match each other.

According to the above-described configuration, the center point of the rotated character and the center point of character data containing the background area match each other. Thus, when multiple pieces of character data are arranged so that the center points thereof lie on a reference line, not only are the center points of the characters aligned along the reference line, but also bottom portions of the characters are aligned along the reference line. Thus, it is possible to prevent an inconvenience in that the characters look uneven from the viewpoint of bottom alignment. As a result, even when multiple pieces of character data are to be obliquely arranged in a row, it is possible to display the character data in an easy-to-view manner with the bottom portions of the characters being aligned with each other.

BRIEF DESCRIPTION OF THE DRAWINGS

FIG. 1 is a block diagram showing an example of the functional configuration of a character-data generating device according to an embodiment of the present invention;

FIGS. 2A to 2C show examples of character data processed by the character-data generating device according to the present embodiment;

FIG. 12 illustrates a known technology and shows a state in which BMP data of rotated characters are arranged in a row along an oblique road;

FIGS. 13A and 13B show examples of BMP data of a regular-position character and BMP data of a rotated character obtained by rotating the regular-position character by a predetermined angle.

DETAILED DESCRIPTION OF THE PREFERRED EMBODIMENTS

Figure 3:
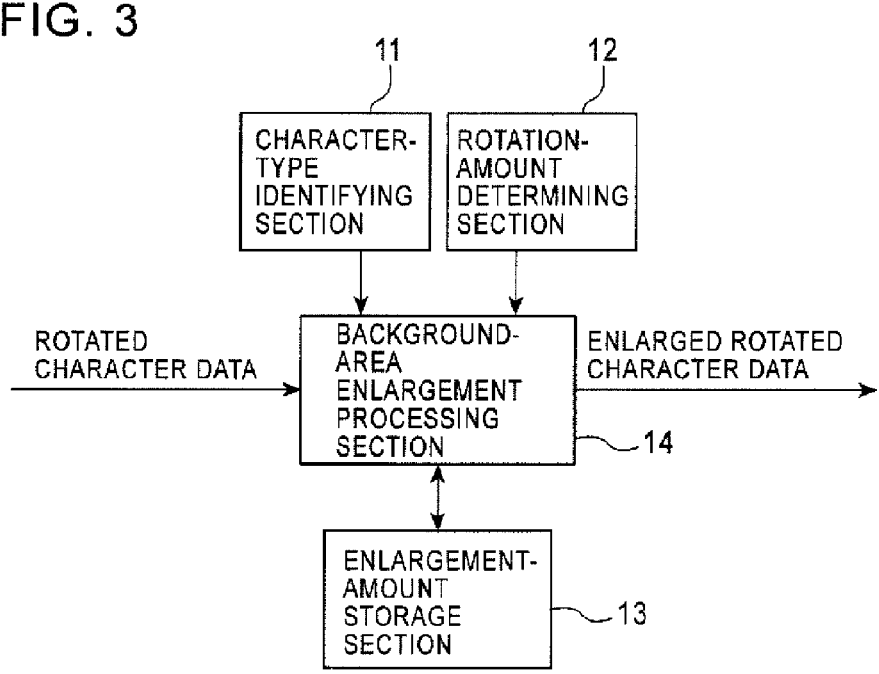
FIG. 3 is a block diagram showing an example of the functional configuration of a center-point matching processing section according to the present embodiment.

An embodiment of the present invention will be described below with reference to the accompanying drawings. FIG. 1 is a block diagram showing an example of the functional configuration of a character-data generating device 100 according to one embodiment. FIGS. 2A to 2C show examples of character data processed by the character-data generating device 100 according to the present embodiment.

As shown in FIG. 1, the character-data generating device 100 according to the present embodiment includes a character-data obtaining section 1, a character-data rotating section 2, a center-point matching processing section 3, and a transparency processing section 4. In practice, the functional blocks 1 to 4 are implemented by, for example, a CPU or MPU and RAM or ROM in a computer and can be achieved by running a program stored in the RAM or ROM.

The character-data obtaining section 1 obtains character data in which a regular-position character having a rotation angle of 0° exists on a rectangular background area having four sides with which at least part of the regular-position character is in contact (the character data is hereinafter referred to as "regular-position character data"), the center point of the regular-position character and the center point of the background area matching each other. FIG. 2A shows an example of regular-position character data obtained by the character-data obtaining section 1. The regular-position character data obtained in this case is data obtained by converting a single character into a bitmap (BMP) image. The center point of a background area also corresponds to the center point of the BMP data.

In the regular-position character data containing the regular-position character and the background area, the size of the background area is set to have a minimum size that can contain the regular-position character, in order to minimize the data size. That is, the regular-position character data is created by trimming the rectangular background area very closely to the contour of a regular-position character. Thus, for example, when the regular-position characters are letters A to Z and a to z, the regular-position character for each alphabet is in contact with the sides of the rectangle of the background area.

The character-data obtaining section 1 may obtain such regular-position character data externally. For example, by reading the regular-position character data from a removable storage medium, the character-data obtaining section 1 obtains the regular-position character data. Alternatively, through connection with a communications network such as the Internet, the character-data obtaining section 1 may obtain the regular-position character data by downloading it from a server on the Internet. Alternatively, by generating regular-position character data, the character-data generating device 100 according to the present embodiment may obtain the data. In addition, when the character-data generating device 100 of the present embodiment is incorporated into electronic equipment (such as a navigation apparatus), the character-data generating device 100 may obtain the regular-position character data by reading it from a storage medium (such as a hard disk) included in the electronic equipment.

Which character type of regular-position character data the character-data obtaining section 1 obtains from multiple character types of regular-position character data may be predetermined or may be arbitrary selected by a user of the character-data generating device 100. When the character-data generating device 100 of the present embodiment is incorporated into electronic equipment (such as a navigation apparatus), the selection of the regular-position character data may be determined in accordance with an instruction issued from a controller included in the electronic equipment. The number of pieces of regular-position character data obtained in this case may be one or more.

Using the regular-position character data obtained by the character-data obtaining section 1, the character-data rotating section 2 forms a rotated character by rotating the regular-position character in a predetermined direction by a predetermined angle with respect to a reference point that is the center point of the background area (which is also the center point of the BMP data), and generates rotated character data in which the rotated character exists on a rectangular deformation background area with at least part of the rotated character being in contact with the sides of the rectangular deformation background area.

In this case, in which direction and by what angle the regular-position character is to be rotated may be set according to predetermined values or may be arbitrarily selected by the user of the character-data generating device 100. Alternatively, when the character-data generating device 100 of the present embodiment is incorporated into electronic equipment (such as a navigation apparatus), the direction and the angle may be determined in accordance with an instruction issued from a controller included in the electronic equipment. When multiple pieces of regular-position character data are to be rotated, it is preferable that all characters be rotated in the same direction and by the same angle, for better appearance of the character data that are subsequently displayed in a row on a display.

FIG. 2B shows an example of character data in a state in which the regular-position character data representing "A" which is shown in FIG. 2A is rotated (the rotated data is hereinafter referred to as "rotated character data"). In this case, the character-data rotating section 2 rotates the regular-position character contained in the regular-position character data leftward by 30° with respect to a reference point 80 that is the center point of the background area (for regular-position character data, the center point matches the center point of BMP data and also matches the center point of its regular-position character) and adjusts the size of the deformation background area to the rotated character.

That is, the rotated character data is also set so that the deformation background area has a minimum size that can contain the rotated character. That is, the rotated character data is created by trimming the rectangular deformation background area very closely to the contour of a rotated character. Thus, the shape of the rotated character data containing the rotated character and the deformation background area may differ from the shape of the original regular-position character data, depending on the character type. This results in mismatching between the center point of the rotated character data (BMP data) and the center point (the reference point 80) of the rotated character contained in the rotated character data.

By horizontally and/or vertically enlarging the deformation background area of the rotated character data generated by the character-data rotating section 2, the center-point matching processing section 3 generates enlarged rotated character data in which the center point of the enlarged deformation background area and the center point of the rotated character match each other. FIG. 2C shows enlarged rotated character data in which the deformation background area of the rotated character data representing "A" which is shown in FIG. 2B is enlarged leftward and upward by predetermined amounts. As shown in FIG. 2C, in the enlarged rotated character data, the center point of the enlarged rotated character data (BMP data) and the center point (the reference point 80) of the rotated character contained in the enlarged rotated character data match each other.

A specific example of processing performed by the center-point matching processing section 3 will now be described. FIG. 3 is a block diagram showing an example of the functional configuration of the center-point matching processing section 3. As shown in FIG. 3, the functional configuration of the center-point matching processing section 3 includes a character-type identifying section 11, a rotation-amount determining section 12, an enlargement-amount storage section 13, and a background-area enlargement processing section 14.

The character-type identifying section 11 identifies the character type of rotated character data whose deformation background area is to be enlarged. The character type to be identified in this case is the character type of regular-position character data obtained by the character-data obtaining section 1. Thus, it is possible to identify a type of character whose deformation background area is to be enlarged by using methods similar to that described for the character-data obtaining section 1 or by causing the character-type identifying section 11 to obtain information indicating a character type from the character-data obtaining section 1.

The rotation-amount determining section 12 determines a rotation direction and a rotation angle when the character-data rotating section 2 rotates the regular-position character data. The rotation direction and the rotation angle when the regular-position character data is rotated can be identified by using methods similar to that described for the character-data rotating section 2 or by causing the rotation-amount determining section 12 to obtain information indicating the rotation direction and the rotation angle from the character-data rotating section 2.

The enlargement-amount storage section 13 pre-stores information of a direction in which the deformation background area is to be enlarged and the amount of the enlargement when the regular-position character is rotated in a predetermined direction by a predetermined angle. As described above, for the rotated character data, the center point of the BMP data and the center point of the rotate character do not match each other, but for the enlarged rotated character data generated through the enlargement of the deformation background area, the center point of the BMP data and the center point of the rotated character match each other. In this case, the direction and the amount of enlargement of the deformation background area which are needed to match the center point of the BMP data and the center point of the rotated character with respect to the enlarged rotated character data are uniquely determined by the direction and the amount of displacement between the center point of the BMP data and the center point of the rotated character with respect to the rotated character data.

Accordingly, a simulation is performed to detect in which direction and to what degree the center point of the rotated character data and the center point of the rotated character are displaced from each other when a certain type of character is rotated in various directions to various degrees. The direction and the amount of enlargement of the deformation background area which are uniquely determined from the direction and the amount of the displacement are pre-stored as information in the enlargement-amount storage section 13. The direction and the amount of enlargement have unique values that vary depending on a character type, a rotation direction, and a rotation angle. Thus, the character type, the rotation direction, the rotation angle, and the direction and the amount of enlargement of the deformation background area can be stored as, for example, tabular information in association with each other.

The background-area enlargement processing section 14 performs processing for enlarging the deformation background area of the rotated character data, generated by the character-data rotating section 2, by the amount of enlargement which is stored in the enlargement-amount storage section 13 and in an enlargement direction stored in the enlargement-amount storage section 13. Based on the character type identified by the character-type identifying section 11 and the direction and the angle of the rotation of the rotated character which were identified by the rotation-amount determining section 12, the background-area enlargement processing section 14 refers to the tabular information in the enlargement-amount storage section 13 and reads and uses the direction and the amount of the enlargement of the deformation background area which are associated with the character type, the rotation direction, and the rotation angle.

Figure 4:
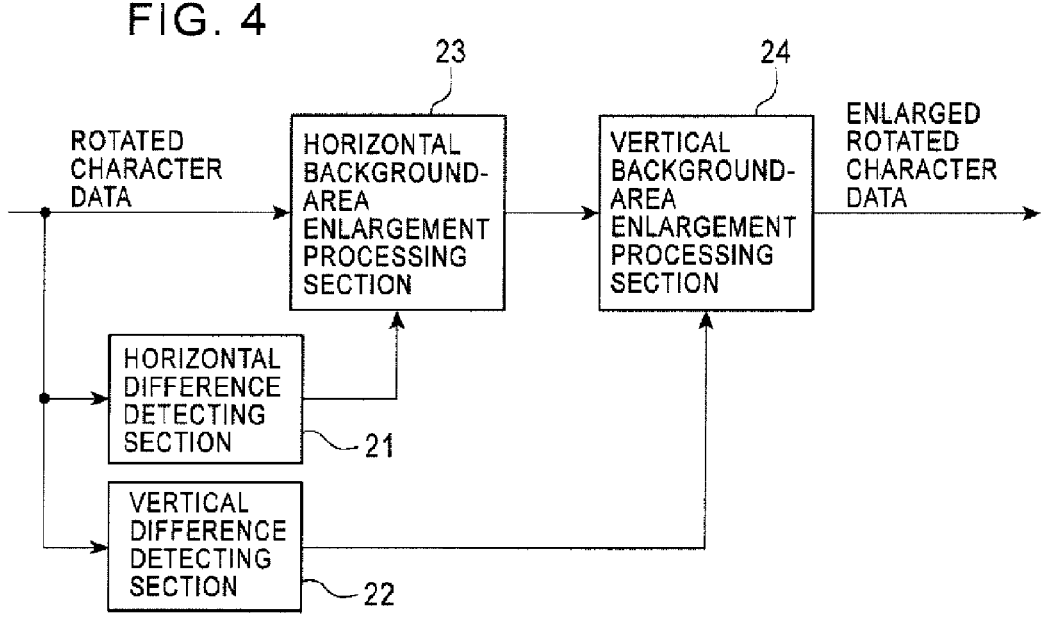
FIG. 4 is a block diagram showing another example of the functional configuration of a center-point matching processing section according to the present embodiment.
Figure 5A:
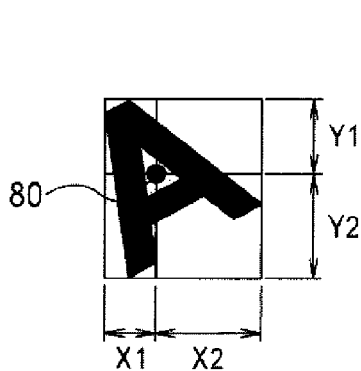
FIGS. 5A and 5B illustrate processing performed by the center-point matching processing section shown in FIG. 4.
Figure 5B:
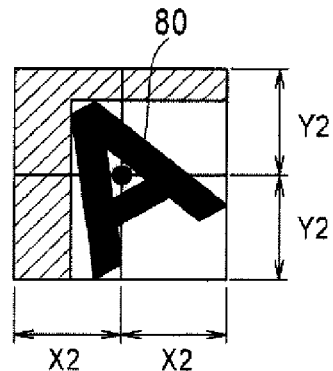

FIG. 4 is a block diagram showing another example of the functional configuration of a center-point matching processing section 3. FIGS. 5A and 5B illustrate processing performed by the center-point matching processing section 3 shown in FIG. 4. Specifically, FIG. 5A shows a state before the deformation background area is enlarged and FIG. 5B shows a state after the deformation background area is enlarged. As shown in FIG. 4, this center-point matching processing section 3 may have a functional configuration that includes a horizontal difference detecting section 21, a vertical difference detecting section 22, a horizontal background-area enlargement processing section 23, and a vertical background-area enlargement processing section 24, instead of the functional configuration shown in FIG. 3.

Using the rotated character data generated by the character-data rotating section 2, the horizontal difference detecting section 21 detects a distance X1 from the reference point 80 to the left edge of the rotated character and a distance X2 from the reference point 80 to the right edge of the rotated character, viewed in left and right horizontal directions from the rotation reference point 80, and determines a difference |X1−X2| of the distances. The reference point 80 used in this case is the center point of the background area obtained when the character-data rotating section 2 rotates the regular-position character data, is also the center point of the regular-position character, and also matches the center point of the rotated character (but is displaced from the center point of the BMP data).

Using the rotated character data generated by the character-data rotating section 2, the vertical difference detecting section 22 detects a distance Y1 from the reference point 80 to the upper edge of the rotated character and a distance Y2 from the reference point 80 to the lower edge of the rotated character, viewed in upward and downward vertical directions from the reference point 80, and determines a difference |Y1−Y2| of the distances.

The horizontal background-area enlargement processing section 23 horizontally enlarges the deformation background area toward the shorter side of the left and right distances X1 and X2 by an amount corresponding to the difference |X1−X2| determined by the horizontal difference detecting section 21. In the example shown in FIG. 5A, since the distance X1 from the reference point 80 to the left edge of the rotated character is smaller than the distance X2 from the reference point 80 to the right edge of the rotated character, the horizontal background-area enlargement processing section 23 enlarges the deformation background area leftward by an amount corresponding to the difference |X1−X2|.

The vertical background-area enlargement processing section 24 vertically enlarges the deformation background area toward the shorter side of the upper and lower distances Y1 and Y2 by an amount corresponding to the difference |Y1−Y2| determined by the vertical difference detecting section 22. In the example shown in FIG. 5A, since the distance Y1 from the reference point 80 to the upper edge of the rotated character is smaller than the distance Y2 from the reference point 80 to the lower edge of the rotated character, the vertical background-area enlargement processing section 24 enlarges the deformation background area upward by an amount corresponding to the difference |Y1−Y2|.

As a result of such enlargement processing of the enlargement background area, the distance from the reference point 80 to the left edge of the rotated character becomes X2 and matches the distance from the reference point 80 to the right edge of the rotated character, as shown in FIG. 5B. Also, the distance from the reference point 80 to the upper edge of the rotated character becomes Y2 and matches the distance from the reference point 80 to the lower edge of the rotated character. Consequently, even with respect to the enlarged rotated character data, the center point (the reference point 80) of the rotated character and the center point of the BMP data match each other.

According to the configuration shown in FIG. 4, by measuring the distances X1, X2, Y1, and Y2 through image processing, it is possible to match the center point of the enlarged rotated character data (the BMP data) and the center point of the rotated character by enlarging the deformation background area by an appropriate amount in an appropriate direction, without identifying the character type, the rotation type, and the rotation angle of the rotated character whose deformation background area is to be enlarged. This arrangement can eliminate the pre-simulation and storage of the direction and the amount of enlargement of the deformation background area.

The transparency processing section 4 shown in FIG. 1 performs transparency processing on the deformation background area enlarged by the center-point matching processing section 3. A portion subjected to the transparency processing may be the entire enlarged deformation background area (including the deformation background area before enlargement) or may be the area of an enlarged portion.

The enlarged rotated character data generated by the center-point matching processing section 3 varies in the size and position of the enlarged deformation background area occupied in the BMP data, depending on the character type. Thus, when an attempt is made to arrange and display multiple types of enlarged rotated character data at regular intervals, there is a case in which the rotated characters that are actually seen are not arranged at regular intervals even when the BMP data are arranged at regular intervals.

Accordingly, when the transparency processing section 4 performs transparency processing on the enlarged deformation background area and a display controller (not shown) displays multiple types of enlarged rotated character data in a row, arranging the enlarged rotated character data so that enlarged portions of the enlarged deformation background area subjected to the transparency processing overlap parts of the adjacent enlarged rotated character data in a row makes it possible to arrange the rotated characters at regular intervals.

When only one character is to be displayed or the character-data generating device 100 is used for an application in which rotated characters do not need to be arranged at regular intervals, it is not necessarily required to perform transparency processing. However, when it is desired to arrange multiple types of rotated characters at regular intervals, it is preferable that transparency processing be performed as described above and the enlarged rotated character data be arranged in a row so that part of the background area of a piece of the enlarged rotated character data overlaps part of the adjacent enlarged rotated character data.

Figure 6:
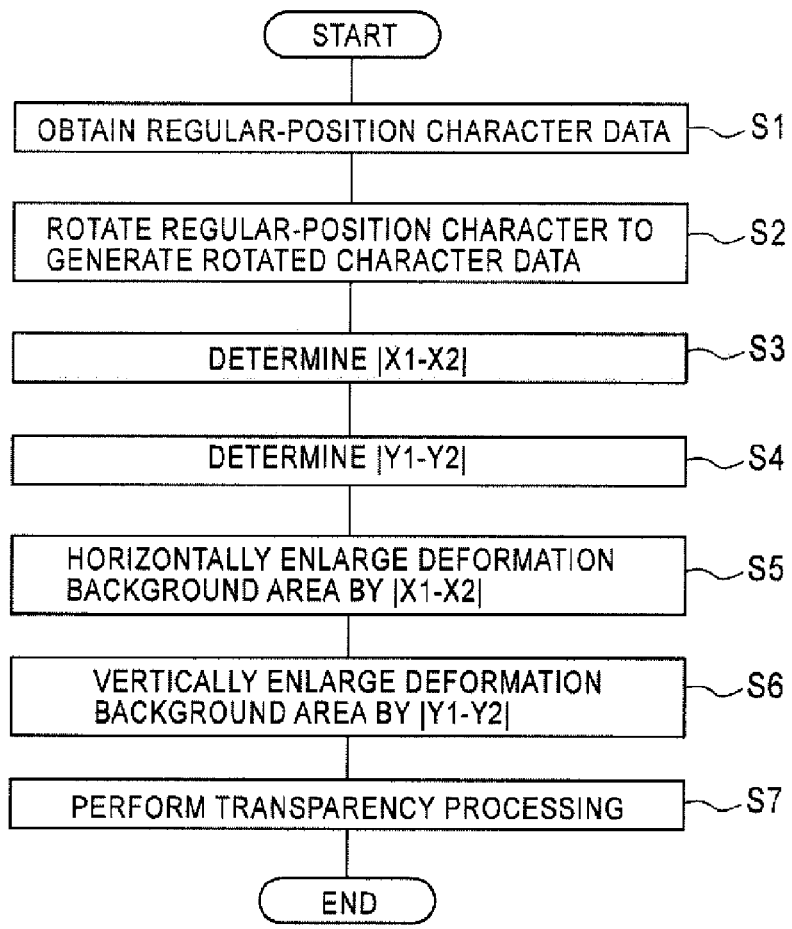
FIG. 6 is flowchart showing an example of the operation of the character-data generating device according to the present embodiment.

FIG. 6 is a flowchart showing an example of the operation of the character-data generating device 100 according to the present embodiment, i.e., an example of a processing procedure for a character-data generating method according to the present embodiment. Referring to FIG. 6, first, in step S1, the character-data obtaining section 1 obtains regular-position character data. Next, in step S2, the character-data rotating section 2 performs image processing using the regular-position character data obtained by the character-data obtaining section 1 to generate rotated character data.

Next, in step S3, using the rotated character data generated by the character-data rotating section 2, the horizontal difference detecting section 21 in the center-point matching processing section 3 determines a difference |X1−X2| between the distance X1 from the reference point 80 to the left edge of the rotated character and the distance X2 from the reference point 80 to the right edge of the rotated character.

In step S4, using the rotated character data generated by the character-data rotating section 2, the vertical difference detecting section 22 in the center-point matching processing section 3 determines a difference |Y1−Y2| between the distance Y1 from the reference point 80 to the upper edge of the rotated character and the distance Y2 from the reference point 80 to the lower edge of the rotated character.

Next, in step S5, the horizontal background-area enlargement processing section 23 horizontally enlarges the deformation background area toward the side having the shorter distance to the edge of the rotated character in the left and right directions viewed from the reference point 80, by an amount corresponding to the horizontal difference |X1−X2| determined by the horizontal difference detecting section 21.

In step S6, the vertical background-area enlargement processing section 24 vertically enlarges the deformation background area toward the side having the shorter distance to the edge of the rotated character in the upward and downward directions viewed from the reference point 80, by an amount corresponding to the vertical difference |Y1−Y2| determined by the vertical difference detecting section 22. Lastly, in step S7, the transparency processing section 4 performs transparency processing on the enlarged deformation background area to complete enlarged rotated character data.

Figure 7:
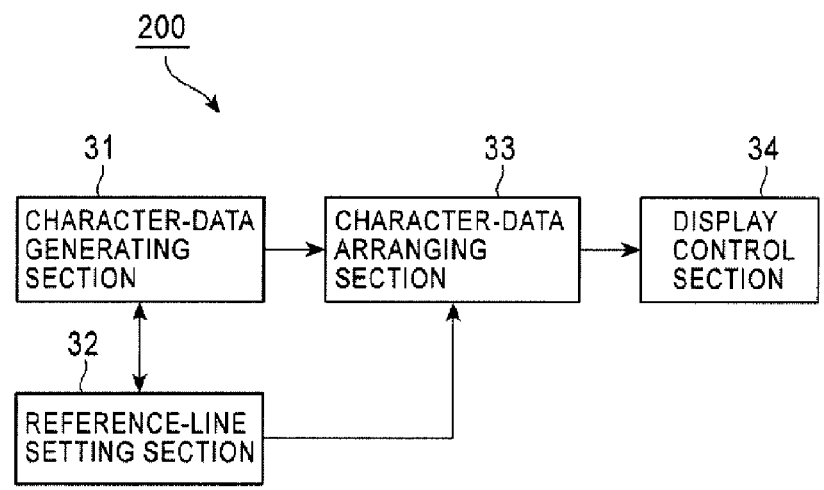
FIG. 7 is a block diagram showing an example of the functional configuration of a character-data display control device according to the present embodiment.

Next, a description will be given of a character-data control device configured using the above-described character-data generating device 100 of the present embodiment. FIG. 7 is a block diagram showing an example of the functional configuration of a character-data display control device 200 according to the present embodiment. As shown in FIG. 7, the character-data display control device 200 according to the present embodiment includes a character-data generating section 31, a reference-line setting section 32, a character-data arranging section 33, and a display control section 34. In practice, the functional blocks 31 to 34 are implemented by, for example, a CPU or MPU and RAM or ROM in a computer and can be achieved by running a program stored in the RAM or ROM.

The character-data generating section 31 has a function that is equivalent to that of the character-data generating device 100 shown in FIG. 1. That is, the character-data generating section 31 includes a character-data obtaining section 1 for obtaining regular-position character data, a character-data rotating section 2 for generating rotated character data, a center-point matching processing section 3 for generating enlarged rotated character data, and a transparency processing section 4 for performing transparency processing on the background area of the enlarged rotated character data.

The reference-line setting section 32 sets a reference line used when multiples pieces of enlarged rotated character data generated by the character-data generating section 31 are arranged together. The reference line can be arbitrarily set and may be a straight line or a curved line. The type of reference line to be set may be predetermined or may be arbitrarily selected by the user of the character-data display control device 200. Alternatively, when the character-data display control device 200 of the present embodiment is incorporated into electronic equipment (such as a navigation apparatus), the direction and the angle may be determined in accordance with an instruction issued from a controller included in the electronic equipment.

When consideration is given to ease of viewing by arranging multiple pieces of characters in order, it is preferable that the reference line be a straight line. It is also preferable that the horizontal angle of the reference line be the same as the rotation angle defined when the regular-position character is rotated to generate rotated character data. It is preferable that, for leftward rotation of the regular-position character, the gradient direction of the reference line has a positive gradient angle, and for rightward rotation of the regular-position character, the gradient direction of the reference line has a negative gradient angle.

Although an example for setting the reference line in accordance with the rotation direction and the rotation angle when the regular-position character is rotated to generate rotated character data has been described above, the arrangement may be such that the reference line is first set and the rotation direction and the rotation angle of the regular-position character are then set in accordance with the gradient direction and the gradient angle of the reference line.

The character-data arranging section 33 arranges multiple pieces of enlarged rotated character data in a row so that the center points (which are the rotation reference points 80 when the character-data generating section 31 rotates the regular-position characters, and are also the center points of the rotated characters) of the enlarged rotated character data (BMP data) lie on the reference line set by the reference-line setting section 32. Based on the multiple pieces of enlarged rotated character data arranged by the character-data arranging section 33, the display control section 34 performs control so as to display a character string thereof on the screen of a display.

Figure 8:
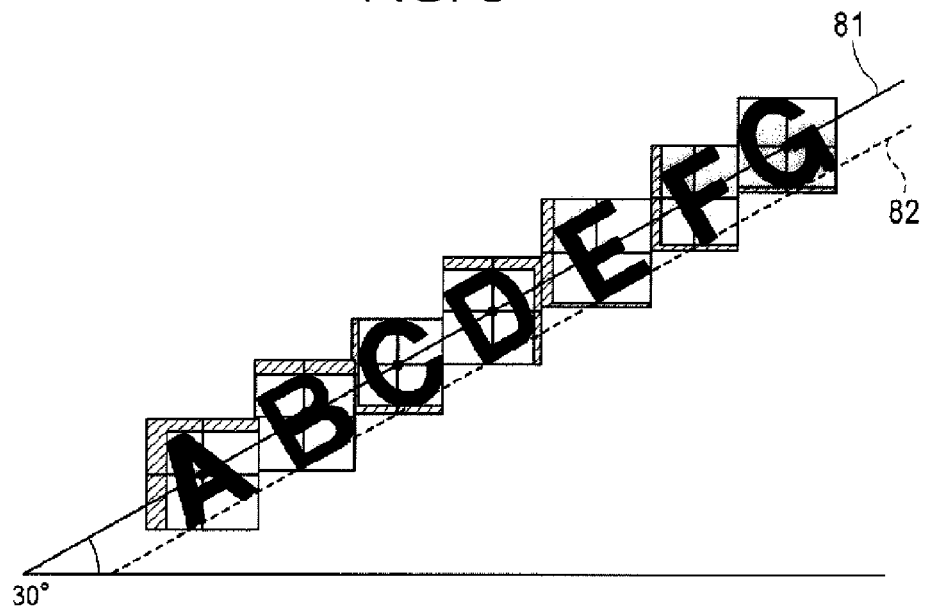
FIG. 8 shows a state in which multiple pieces of enlarged rotated character data are arranged by a character-data arranging section of the present embodiment.

FIG. 8 shows an example of when the character-data arranging section 33 arranges multiple pieces of enlarged rotated character data. Seven pieces of enlarged rotated character data for the letters "A" to "G" shown in FIG. 8 are generated by causing the character-data generating section 31 to rotate regular-position characters leftward by 30°. A reference line 81 is a straight line set so that the angle relative to the horizontal direction is 30° and the gradient direction has a positive gradient angle.

The character-data arranging section 33 arranges the seven pieces of enlarged rotated character data in a row so that all the center points of the BMP data lie on the reference line 81. In the enlarged rotated character data arranged in this case, the center points of the rotated characters and the center points of the BMP data match each other. Thus, when the enlarged rotated character data are arranged so that the center points of the BMP data lie on the reference line 81, not only are the center points of the rotated characters aligned along the reference line 81, but also the bottom portions of the rotated characters are aligned with respect to the reference line 81 (see auxiliary line 82). As a result, it is possible to prevent an inconvenience in that the rotated characters look uneven from the viewpoint of the bottom alignment, and even when multiple character data are obliquely arranged in a row, it is possible to display the character data with the bottom portions of the characters being aligned with each other.

In the example shown in FIG. 8, the BMP data of enlarged rotated character data are arranged on the reference line 81 at regular intervals. Multiple pieces of enlarged rotated character data may be arranged in a row so that the center points of the multiple pieces of enlarged rotated character data lie on the reference line 81 and also enlarged portions of the background areas subjected to transparency processing overlap parts of adjacent enlarged rotated character data.

The enlarged rotated character data for the letter "D" has a portion where the deformation background area is enlarged rightward and the enlarged rotated character data for the letter "E" to the right thereof has a portion where the deformation background area is enlarged leftward. When two adjacent pieces of enlarged rotated character data are arranged so that enlarged portions of the deformation background areas face each other, an enlarged portion of a first piece of the enlarged rotated character data overlaps part of a second piece of the enlarged rotated character data, assuming that the second piece of the enlarged rotated character data does not have an enlarged portion. For example, assuming that the enlarged rotated character data for the letter "D" does not have a portion enlarged rightward, the enlarged rotated character data are arranged so that the portion enlarged leftward with respect to the enlarged rotated character data for the letter "E" overlaps part of the enlarged rotated character data for the letter "D".

Figure 9:
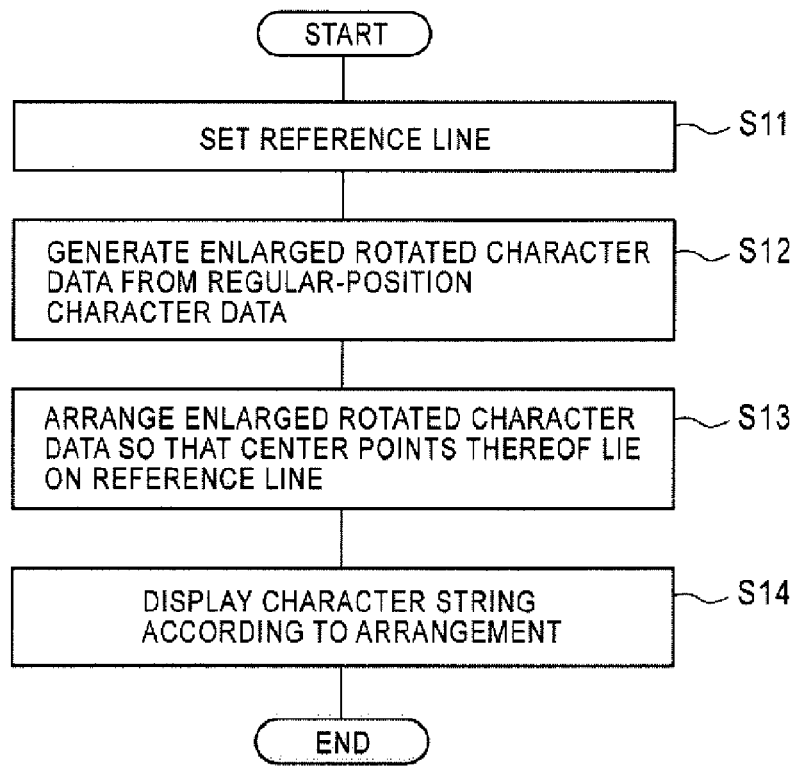
FIG. 9 is flowchart showing an example of the operation of the character-data display control device according to the present embodiment.

FIG. 9 is a flowchart showing an example of the operation of the character-data display control device 200 according to the present embodiment, i.e., an example of a processing procedure for a character-data displaying method according to the present embodiment. Referring to FIG. 9, first, in step S11, the reference-line setting section 32 sets a reference line 81 used when at least one piece of enlarged rotated character data is arranged in a row. Next, in step S12, the character-data generating section 31 generates enlarged rotated character data from multiple pieces of regular-position character data. A detailed procedure for the enlarged rotated character data generating processing is analogous to, for example, the procedure shown in the flowchart in FIG. 6.

The direction and the angle of rotation of the regular-position characters are determined by the gradient direction and the gradient angle of the reference line 81. For example, when a straight line whose gradient direction has a positive gradient angle and the gradient angle is 30° is set as the reference line 81, the character data rotating section 2 in the character-data generating section 31 rotates the regular-position characters leftward by 30° to generate rotated character data. The center-point matching processing section 3 then enlarges deformation background areas of the rotated character data, and the transparency processing section 4 performs transparency processing on the enlarged deformation background areas to generate at least one piece of enlarged rotated character data.

Next, in step S13, the character-data arranging section 33 arranges the at least one piece of enlarged rotated character data in a row so that the center point of the at least one piece of enlarged rotated character data generated by the character-data generating section 31 lies on the reference line 81 set by the reference-line setting section 32 and an enlarged portion of the background area subjected to the transparency processing overlaps the adjacent enlarged rotated character data. Lastly, in step S14, based on the at least one piece of enlarged rotated character data arranged by the character-data arranging section 33, the display control section 34 performs control so as to display a character string thereof on the screen of the display.

Figure 10:
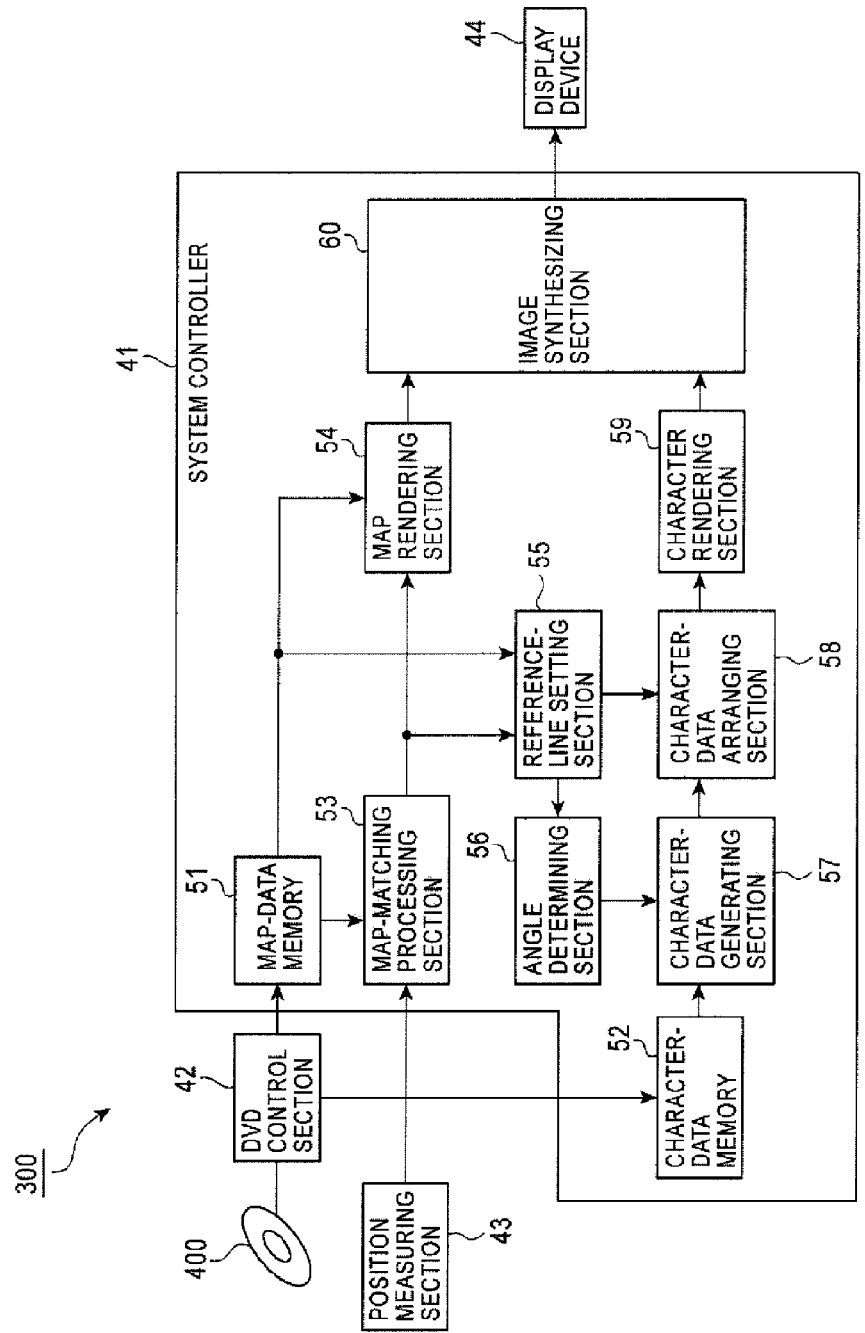
FIG. 10 is a block diagram showing an example of the functional configuration of a navigation apparatus according to the present embodiment.

Next, a description will be given of a navigation apparatus into which the character-data display control device 200 of the above-described embodiment is incorporated. FIG. 10 is a block diagram showing an example of the functional configuration of a navigation apparatus 300 according to the present embodiment. Referring to FIG. 10, a system controller 41 controls the entire navigation apparatus 300. The system controller 41 includes a microcomputer and so on to perform processing for rendering a map and character strings for road names and so on displayed on the map.

A map storage medium 400 (which is not an element of the navigation apparatus), such as a DVD (digital versatile disk), stores map data needed for map display, character string display, route search, and so on. Although the DVD 400 is used as the storage medium for storing the map data, another storage medium, such as a CD-ROM, a hard disk, or a semiconductor memory, may be used. A DVD control section 42 controls reading of the map data from the DVD 400.

The map data stored on the DVD 400 contains information regarding nodes corresponding to road-intersecting points, such as intersections and junctions, and information regarding links corresponding to roads, lanes, and so on, each link providing a connection between one node on a road and another node adjacent thereto. That is, the map data contains a connection node table that includes detailed data of all nodes and a link table that includes detailed data of links, each being identified by two adjacent nodes.

The map data stored on the DVD 400 also contains character data of characters included in character strings for road names and so on to be displayed on a map. The character data is, for example, the above-described regular-position character data. The navigation apparatus 300 of the present embodiment is configured so as to display a character string for a road name or the like by arranging multiple pieces of character data, each piece representing one character. Thus, pieces of regular-position character data are individually prepared for, for example, the letters A to Z and a to z.

A position measuring section 43 measures the current position of a vehicle and includes a dead reckoning sensor, a GPS receiver, a position-computing CPU, and so on. The dead reckoning sensor includes a vehicle-speed sensor (a distance sensor) for detecting a travel distance of the vehicle by outputting a single pulse for each predetermined travel distance and an angular-velocity sensor (a relative-direction sensor) such as a vibrating gyroscope for detecting the rotation angle (or the moving direction) of the vehicle. The dead reckoning sensor uses the vehicle-speed sensor and the angular velocity sensor to detect the relative position and the direction of the vehicle.

The position-computing CPU computes an absolute vehicle position (an estimated vehicle position) and a vehicle direction, based on data of the vehicle relative position and direction output from the dead reckoning sensor. Using a GPS antenna, the GPS receiver receives radio waves transmitted from GPS satellites, and performs two-dimensional or three-dimensional position locating processing to compute the vehicle absolute position and the vehicle direction (the vehicle direction is computed based on the vehicle position at the current point and the vehicle position at a point one sampling period of time $\Delta T$ before).

Based on image data output from the system controller 41, a display device 44 displays a map image showing the vicinity of the vehicle in conjunction with a vehicle-position mark, various landmarks, and character strings for road names and so on.

A detailed configuration of the system controller 41 will now be described. A map-data memory 51 temporarily stores the map data (other than regular-position character data) read from the DVD 400. The map-data memory 51 corresponds to a map-data storage section in the present invention. A character-data memory 52 temporarily stores regular-position character data read from the DVD 400. The character-data memory 52 corresponds to a character-data storage section in the present invention. Although the map-data memory 51 and the character-data memory 52 are separated from each other in this case, they may be configured as a single memory.

Using the map data read to the map-data memory 51, the data of the vehicle position and the vehicle direction measured by the position measuring section 43 in cooperation with the GPS receiver, and the data of the vehicle position and the vehicle direction computed by the position measuring section 43 in cooperation with the dead reckoning sensor, a map matching processing section 53 performs map matching processing for each predetermined vehicle-travel distance to adjust the vehicle traveling position on a road in the map data.

A map rendering section 54 renders map-image data needed to cause the display device 44 to display a map of the vicinity of the vehicle position, based on the map data stored in the map-data memory 51 and the information of the vehicle current position subjected to the map matching processing performed by the map matching processing section 53. The map rendering section 54 generates various landmarks and a vehicle position mark representing a vehicle position and also generates map image data needed to display the various marks together with a map.

A reference-line setting section 55 sets a reference line used for when multiple pieces of enlarged rotated character data generated by a character-data generating section 57 described below are arranged. In the example shown in FIG. 10, the reference-line setting section 55 sets a reference line so that the it is parallel to a road link of a road displayed on a map of the vicinity of the vehicle position, based on the map data stored in the map-data memory 51 and the information of the current vehicle position subjected to the map-matching processing performed by the map matching processing section 53.

An angle determining section 56 determines a gradient angle and a gradient direction of the reference line, set by the reference-line setting section 55, relative to an absolute coordinate system of the reference line. The character-data generating section 57 has a function that is analogous to the character-data generating device 100 shown in FIG. 1, and obtains regular-position character data from the character-data storage section 52 and generates enlarged rotated character data.

The direction and the angle of rotation of the regular-position characters are determined by the gradient direction and the gradient angle of the reference line determined by the angle determining section 56. For example, when the gradient direction of the reference line has a positive gradient angle and the gradient angle is 30', the character-data generating section 57 rotates the regular-position characters leftward by 30° to generate rotated character data. The character-data generating section 57 then enlarges deformation background areas of the rotated character data and performs transparency processing on the enlarged deformation background areas to generate enlarged rotated character data.

A character-data arranging section 58 arranges the multiple pieces of enlarged rotated character data, generated by the character-data generating section 57 in a row, so that the center points of the enlarged rotated character data lie on the reference line set by the reference-line setting section 55. Based on the enlarged rotated character data arranged by the character-data arranging section 58, a character rendering section 59 renders character image data needed to cause the display device 44 to display a road name beside a road on the map.

An image synthesizing section 60 superimposes the character image rendered by the character rendering section 59 onto the map image rendered by the map rendering section 54 and outputs the resulting image to the display device 44. That is, the image synthesizing section 60 corresponds to a display control section in the present invention. Using the map image rendered by the map rendering section 54 based on the map data and the character image rendered by the character rendering section 59 based on the enlarged rotated character data arranged by the character-data arranging section 58, the image synthesizing section 60 performs control so that a character string of a road name is displayed along a road on the map on the screen.

The directions and angles of roads displayed on the map, i.e., the gradient direction and gradient angle of reference lines set so that they are parallel to road links, are not uniform. In some cases, the gradient angles become relatively large. In such cases, greatly rotating the regular-position characters having a rotation angle of 0° causes deformation in the rotated characters. In order to suppress such deformation in the rotated characters, a configuration as follows may be employed.

That is, the character data stored in the character-data memory 52 may contain rotated character data having a rotation angle θ (θ represents one or multiple angles) in addition to the regular-position character data having a rotation angle of 0°. For example, rotated character data rotated leftward by 30°, 60°, and 90° and rotated rightward by 30°, 60°, and 90° are pre-stored in the character-data memory 52. Similar to the regular-position character data, each piece of the rotated character data is also character data in which a rotated character exists on a rectangular background area having four sides with which at least part of the rotated character is in contact, the center point of the rotated character and the center point of the background area matching each other.

In this case, the character-data obtaining section 1 included in the character-data generating section 57 selectively reads, from the character-data memory 52, character data rotated by an angle that is the closest to the gradient direction and gradient angle determined by the angle determining section 56. The character-data rotating section 2 included in the character-data generating section 57 rotates character data read from the character-data obtaining section 1 by an amount corresponding to a difference between the rotation angle of character data read from the character-data obtaining section 1 and the gradient angle determined by the angle determining section 56. Such an arrangement can minimize the amount of character-data rotation performed by the character-data rotating section 2 and can minimize deformation that occurs when the character data is rotated.

Figures 11A, 11B:
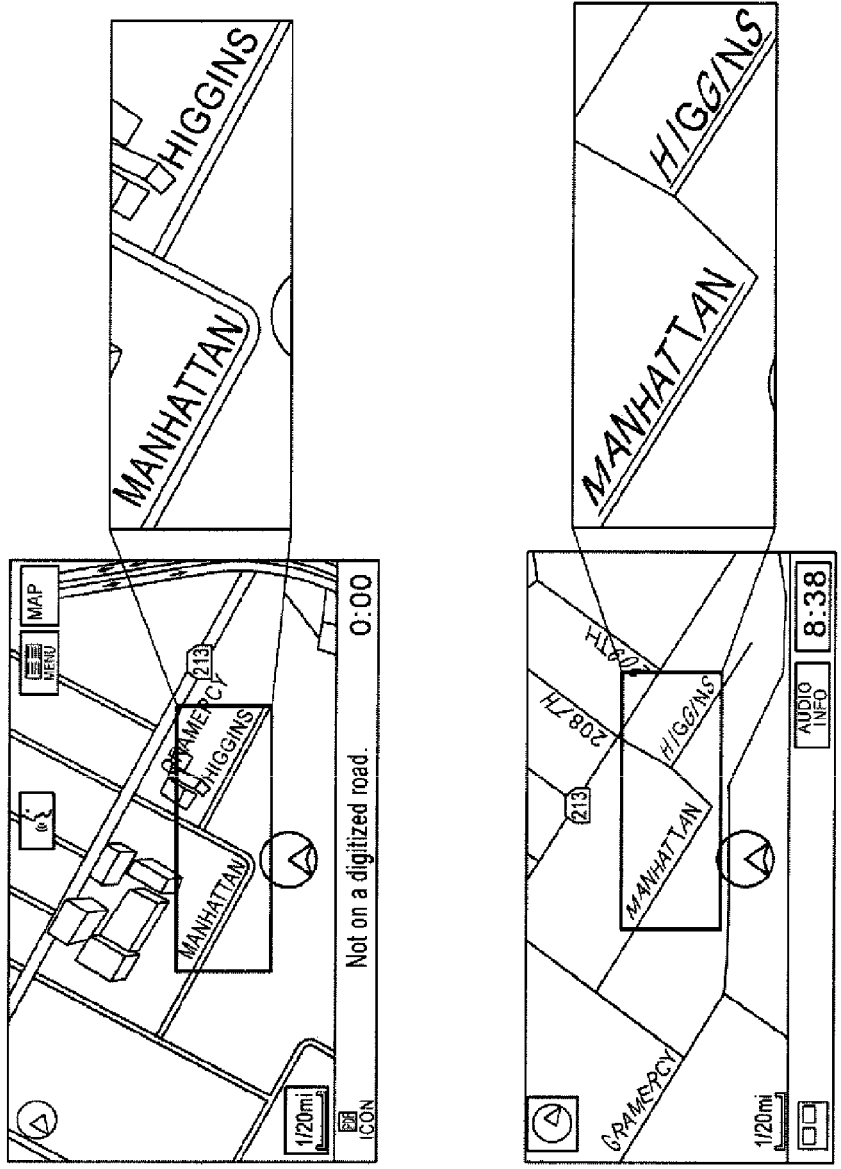
FIGS. 11A and 11B each show an example of a map displayed on a display screen of the navigation apparatus.
Figure 14:
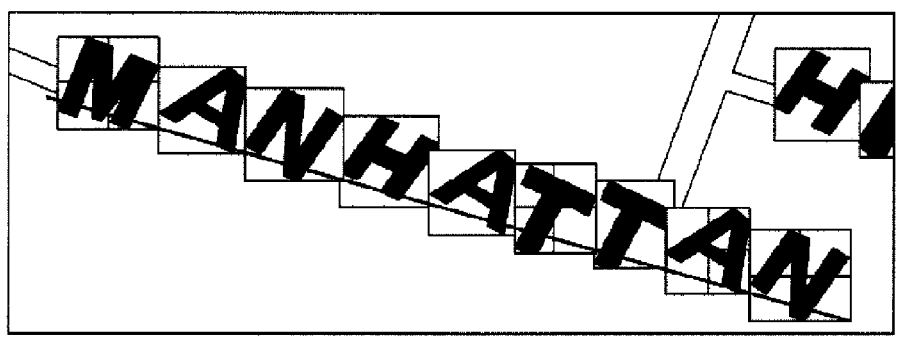
FIG. 14 illustrates a known problem of characters that are not aligned at the bottom.

FIGS. 11A and 11B each show an example of a map displayed on a display screen of the navigation apparatus 300. FIG. 11A shows an example of a map displayed on the navigation apparatus 300 of the present embodiment and FIG. 11B shows an example of a map displayed on a known navigation apparatus. As shown in FIG. 11B, with the known navigation apparatus, road names are not aligned at the bottom and individual characters are deformed due to the rotation. In contrast, according to the navigation apparatus 300 of the present embodiment, road names are substantially aligned at the bottom along roads and almost no deformation of the characters due to the rotation occurs.

As described above in detail, after regular-position characters are rotated by a predetermined angle with respect to the reference points that are the center points of the background areas to generate rotated character data, the deformation background areas of the rotated character data are horizontally and/or vertically enlarged, so as to cause the center points of the enlarged rotated character data (BMP data) and the center points of the rotated characters to match each other.

With the center points of the BMP data and the center points of the rotated characters matching each other, when multiple pieces of enlarged rotated character data are arranged so that the center points thereof lie on the reference line, not only are the center points of the rotated characters aligned along the reference line, but also bottom portions of the rotated characters are aligned with respect to the reference line. Thus, it is possible to prevent an inconvenience in that the rotated characters look uneven from the viewpoint of the bottom alignment. As a result, even when multiple pieces of rotated character data are to be obliquely arranged in a row, it is possible to display the rotated character data in an easy-to-view manner with the bottom portions of the characters being aligned with each other.

Further, in the present embodiment, the background areas of the enlarged rotated character data are subjected to transparency processing, and multiple pieces of enlarged rotated character data are arranged in a row so that the center points of the enlarged rotated character data lie on the reference line and enlarged portions of the background areas subjected to the transparency processing overlap parts of the adjacent enlarged rotated character data. With this arrangement, even when the background areas of the rotated character data are enlarged, at least the enlarged portions are subjected to the transparency processing and are displayed so as to overlap parts of adjacent enlarged rotated character data. Thus, it is possible to prevent an inconvenience in that spaces between characters increase by an amount corresponding to the enlarged background areas. As a result, even when multiple pieces of enlarged rotated character data are to be obliquely arranged in a row, it is possible to display the enlarged rotated character data in an easy-to-view manner with the bottom portions of the characters being aligned with each other at substantially regular intervals.

Although the description in the above embodiment has been given for an example in which processing for generating character data is performed on the letters A to Z and a to z, the present invention is not limited thereto. The processing can be similarly performed on any characters, including Japanese hiragana, katakana, kanji characters, and so on.

Although the description in the above embodiment has been given for an example in which the character-data display control device 200 is applied to a navigation apparatus, electronic equipment to which it is applicable is not limited to the navigation apparatus.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A map display device, comprising:
   a character-data obtaining section that obtains a character string containing a plurality of pieces of regular-position character data in which a regular-position character having a rotation angle of 0° exists on a rectangular background area having four sides with which at least part of the regular-position character is in contact, a center point of the regular-position character and a center point of the background area matching each other;
   a character-data rotating section that forms rotated characters by rotating the regular-position characters in a predetermined direction by a predetermined angle with respect to a reference point that is the center point of the background area by using the regular-position character data obtained by the character-data obtaining section, to generate rotated character data in which the rotated characters exist on corresponding rectangular deformation background areas having four sides with which at least part of the rotated character is in contact; and
   a center-point matching processing section that horizontally and/or vertically enlarges the deformation background areas of the rotated character data generated by the character-data rotating section, to generate enlarged rotated character data in which center points of the enlarged deformation background areas and center points of the corresponding rotated characters match each other.

2. The map display device according to claim 1, wherein the center-point matching processing section comprises:
   an enlargement-amount storage section that pre-stores information of a direction in which the deformation background area is to be enlarged and an amount of the enlargement when the regular-position character is rotated in the predetermined direction by the predetermined angle; and
   a background-area enlargement processing section that enlarges the deformation background area of the rotated character data, generated by the character-data rotating section, in an enlargement direction stored by the enlargement-amount storage section by an amount of enlargement stored by the enlargement-amount storage section.

3. The map display device according to claim 1, further comprising:
   a horizontal difference detecting section that detects a distance from the reference point to a left edge of the rotated character and a distance from the reference point to a right edge of the rotated character, viewed in left and right horizontal directions from the reference point, and determines a difference between both distances, by using the rotated character data generated by the character-data rotating section;
   a vertical difference detecting section that detects a distance from the reference point to an upper edge of the rotated character and a distance from the reference point to a lower edge of the rotated character, viewed in upward and downward vertical directions from the reference point, and determines a difference between both distances, by using the rotated character data generated by the character-data rotating section;
   a horizontal background-area enlargement processing section that horizontally enlarges the deformation background area toward a shorter side of the left and right distances by an amount corresponding to the difference determined by the horizontal difference detecting section; and
   a vertical background-area enlargement processing section that vertically enlarges the deformation background area toward a shorter side of the upper and lower distances by an amount corresponding to the difference determined by the vertical difference detecting section.

4. The map display device according to claim 1, further comprising a transparency processing section that performs transparency processing on the deformation background area enlarged by the center-point matching processing section.

5. A map display method, comprising:
   causing a computer to obtain a character string containing a plurality of pieces of regular-position character data in which a regular-position character having a rotation angle of 0° exists on a rectangular background area having four sides with which at least part of the regular-position character is in contact, a center point of the regular-position character and a center point of the background area matching each other;
   causing the computer to perform image processing using the obtained regular-position character data, to form rotated characters by rotating the regular-position characters in a predetermined direction by a predetermined angle with respect to a reference point that is the center point of the background area and to generate rotated character data in which the rotated characters exist on corresponding rectangular deformation background areas having four sides with which at least part of the rotated character is in contact; and
   causing the computer to perform image processing for horizontally and/or vertically enlarging the deformation background areas of the rotated character data generated by the rotation, to cause center points of the enlarged deformation background areas and center points of the corresponding rotated characters to match each other.

6. The map display method according to claim 5, wherein the third act comprises:
   detecting a distance from the reference point to a left edge of the rotated character and a distance from the reference point to a right edge of the rotated character, viewed in left and right horizontal directions from the reference point, and determining a difference between both distances, by using the rotated character data generated in the second act;

detecting a distance from the reference point to an upper edge of the rotated character and a distance from the reference point to a lower edge of the rotated character, viewed in upward and downward vertical directions from the reference point, and determining a difference between both distances, by using the rotated character data generated in the second;

horizontally enlarging the deformation background area toward a shorter side of the left and right distances by an amount corresponding to the difference between the distances; and vertically enlarging the deformation background area toward a shorter side of the upper and lower distances by an amount corresponding to the difference between the distances.

7. A map display device, comprising:

a character-data obtaining section that obtains a character string containing a plurality of pieces of regular-position character data in which regular-position characters having a rotation angle of 0° exist on rectangular background areas, each area having four sides with which at least part of the corresponding regular-position character is in contact, center points of the regular-position characters and center points of the corresponding background areas matching each other;

a character-data rotating section that forms rotated characters by rotating the regular-position characters in a predetermined direction by a predetermined angle with respect to corresponding reference points that are the center points of the background areas by using the regular-position character data obtained by the character-data obtaining section, to generate rotated character data in which the rotated characters exist on corresponding rectangular deformation background areas, each area having four sides with which at least part of the corresponding rotated character is in contact;

a center-point matching processing section that horizontally and/or vertically enlarges the deformation background areas of the rotated character data generated by the character-data rotating section, to generate multiple pieces of enlarged rotated character data in which center points of the enlarged deformation background areas and center points of the corresponding rotated characters match each other;

a reference-line setting section that sets a reference line used when the multiple pieces of enlarged rotated character data are arranged in a row;

a character-data arranging section that arranges the multiple pieces of enlarged rotated character data so that the center points of the enlarged rotated character data lie on the reference line set by the reference-line setting section; and a display control section that performs control so as to display a character string on a screen based on the multiple pieces of enlarged rotated character data arranged by the character-data arranging section.

8. The map display device according to claim 7, further comprising a transparency processing section that performs transparency processing on the background areas of the enlarged rotated character data generated by the center-point matching processing section, wherein the character-data arranging section arranges the multiple pieces of enlarged rotated character data in a row so that the center points of the multiple pieces of enlarged rotated character data lie on the reference line set by the reference-line setting section and enlarged portions of the background areas subjected to the transparency processing overlap parts of the adjacent enlarged rotated character data.

9. A map display method, comprising:

a first act of setting a reference line used when multiple pieces of character data are arranged in a row;

a second act of obtaining a character string containing a plurality of pieces of regular-position character data in which a regular-position character having a rotation angle of 0° exists on a rectangular background area having four sides with which at least part of the regular-position character is in contact, a center point of the regular-position character and a center point of the background area matching each other;

a third act of forming a rotated characters by rotating each regular-position character in a predetermined direction by a predetermined angle with respect to a reference point that is the center point of the background area by using the regular-position character data obtained in the second act, to generate a character string containing a plurality of pieces of rotated character data in which the rotated characters exist on corresponding rectangular deformation background areas having four sides with which at least part of the rotated character is in contact;

a fourth act of horizontally and/or vertically enlarging the deformation background area of the rotated character data generated in the third act, to generate a character string containing a plurality of pieces of enlarged rotated character data in which center points of the enlarged deformation background areas and center points of the corresponding rotated characters match each other;

a fifth act of arranging the enlarged rotated character data generated in the fourth act so that the center points of the enlarged rotated character data lie on the reference line set in the first act; and a sixth act of performing control so as to display the character string on a screen based on the enlarged rotated character data arranged in the fifth act.

10. The map display method according to claim 9, further comprising, subsequent to the fourth act, a seventh act of performing transparency processing on the background areas of the enlarged rotated character data generated in the fourth act, wherein in the fifth act, the enlarged rotated character data are arranged in a row so that the center points of the enlarged rotated character data lie on the reference line set in the first act and an enlarged portion of the background areas subjected to the transparency processing overlaps part of the adjacent enlarged rotated character data.

11. A navigation apparatus, comprising:

a character-data storage section that stores multiple pieces of regular-position character data in which regular-position characters having a rotation angle of 0° exist on rectangular background areas, each area having four sides with which at least part of the corresponding regular-position character is in contact, center points of the regular-position characters and center points of the corresponding background areas matching each other;

a character-data generating device as in claim 1 that obtains the regular-position character data from the character-data storage section and generates multiple pieces of enlarged rotated character data representing a character string containing a plurality of characters;

a map-data storage section that stores map data containing a road link;

a reference-line setting section that sets a reference line used when the multiple pieces of enlarged rotated character data are arranged in a row so that the reference line is parallel to the road link contained in the map data;

a character-data arranging section that arranges the multiple pieces of enlarged rotated character data in a row so that the center points of the multiple pieces of enlarged rotated character data lie on the reference line set by the reference-line setting section; and a display control section that performs control to display the character string along a road on a map on a screen based on the multiple pieces of enlarged rotated character data arranged by the character-data arranging section and the map data read from the map-data storage section.

12. The navigation apparatus according to claim 11, wherein the character-data generating device comprises a transparency processing section that performs transparency processing on the background areas of the enlarged rotated character data, wherein the character-data arranging section arranges the multiple pieces of enlarged rotated character data in a row so that the center points of the multiple pieces of enlarged rotated character data lie on the reference line set by the reference-line setting section and enlarged portions of the background areas subjected to the transparency processing overlap parts of adjacent enlarged rotated character data.

13. The navigation apparatus according to claim 11, further comprising an angle determining section that determines a gradient angle and a gradient direction of the reference line, set by the reference-line setting section, relative to an absolute coordinate system of the reference line;

wherein the character-data storage section stores, in addition to the character data of the regular-position character, at least one piece of character data in which a rotated-position character having a rotation angle $\theta$ exists on a rectangular background area having four sides with which at least part of the rotated-position character is in contact, a center point of the rotated-position character and a center point of the background area matching each other, where $\theta$ indicates an arbitrary one or multiple angles other than 0°; and the character-data obtaining section included in the character-data generating device selectively reads character data having an angle that is the closest to the gradient angle determined by the angle determining section from the character data of the regular-position characters data and the character data of the rotated-position character, the character data being stored by the character-data storage section, and the character-data rotating section included in the character-data generating device rotates the character data, read by the character-data obtaining section, by an amount corresponding to a difference between a rotation angle of the character data read by the character-data obtaining section and the gradient angle determined by the angle determining section.

\* \* \* \* \*